June 26, 1928.
N. MARCALUS
1,674,976
PLANER CONTROL MECHANISM
Filed Dec. 15, 1924
7 Sheets-Sheet 6
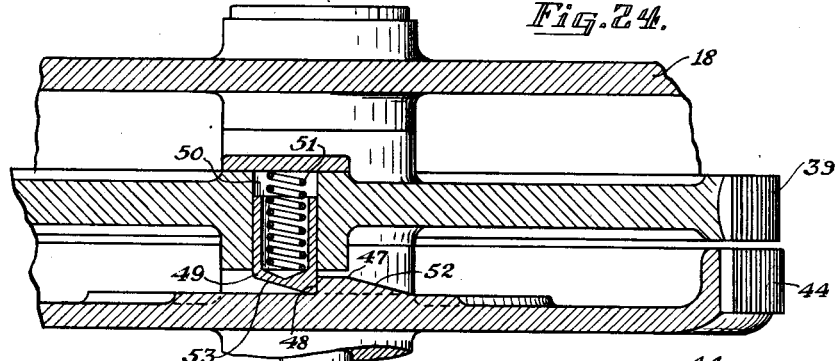
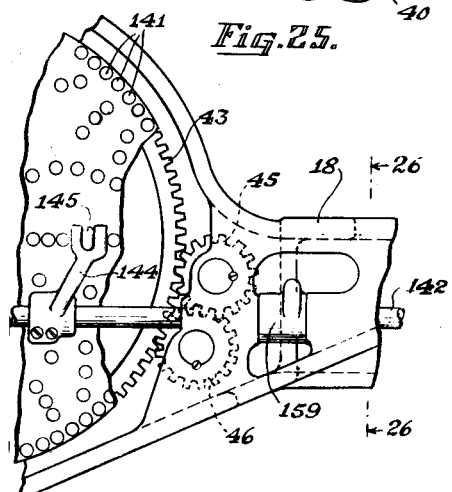
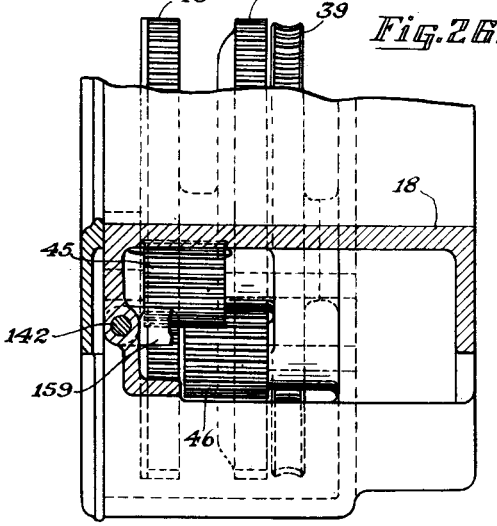
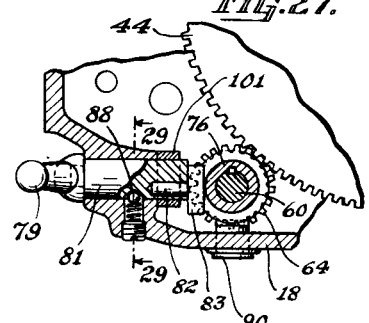
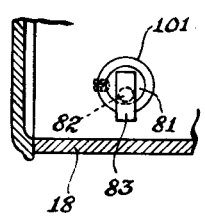
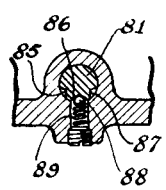
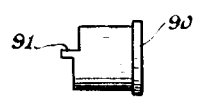
INVENTOR
N. Marcalus.
BY Wayne B Wells
ATTORNEY

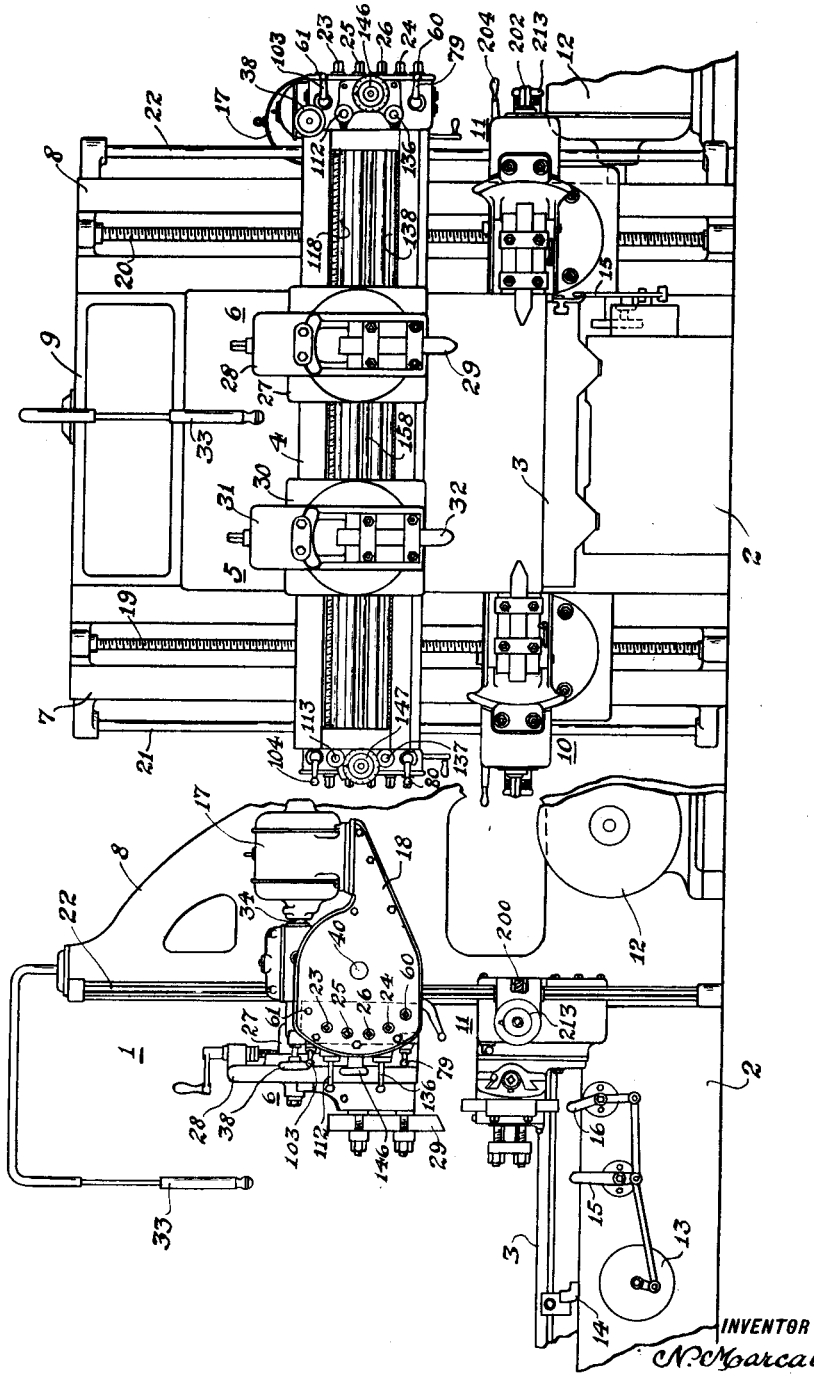

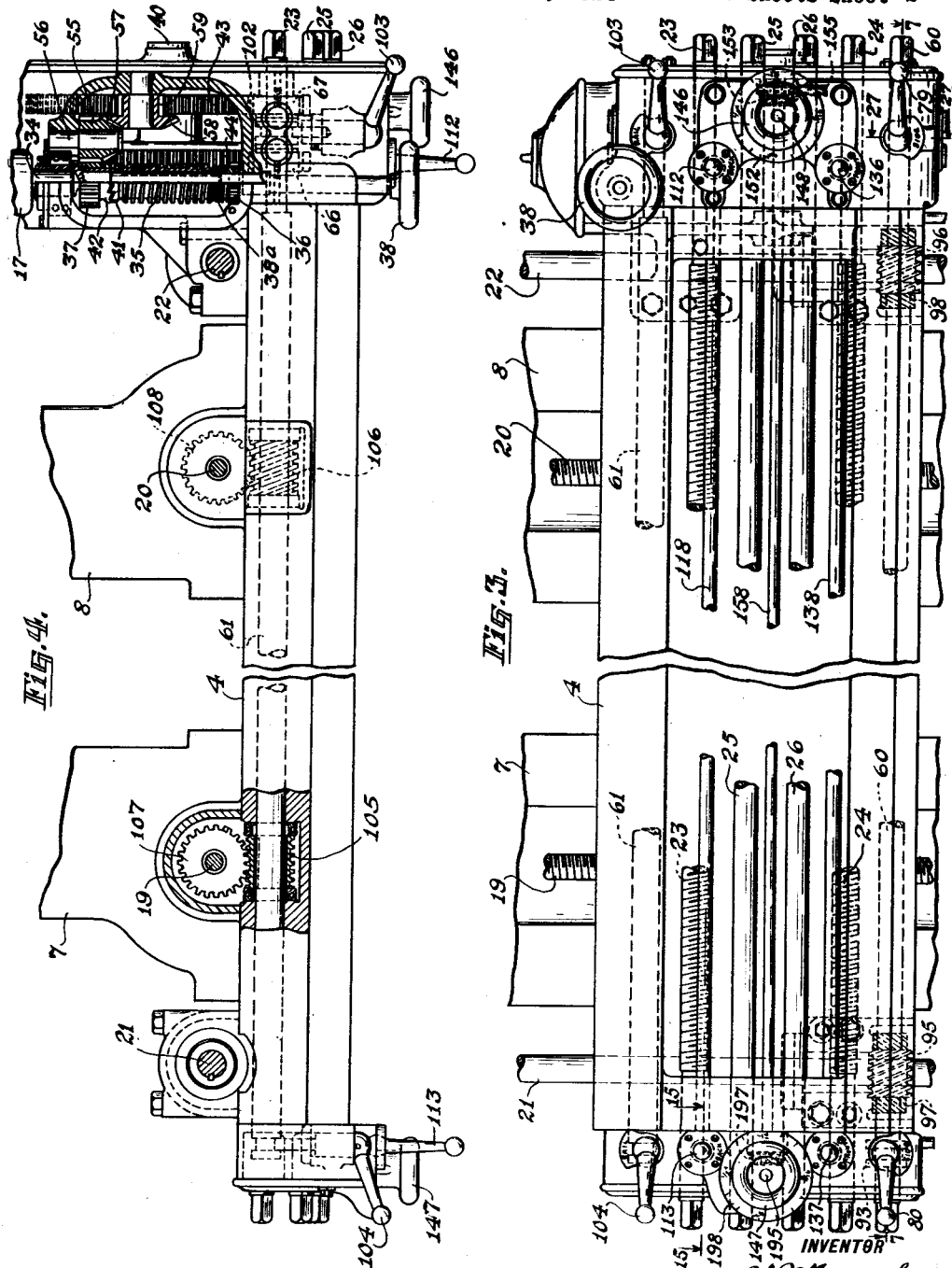

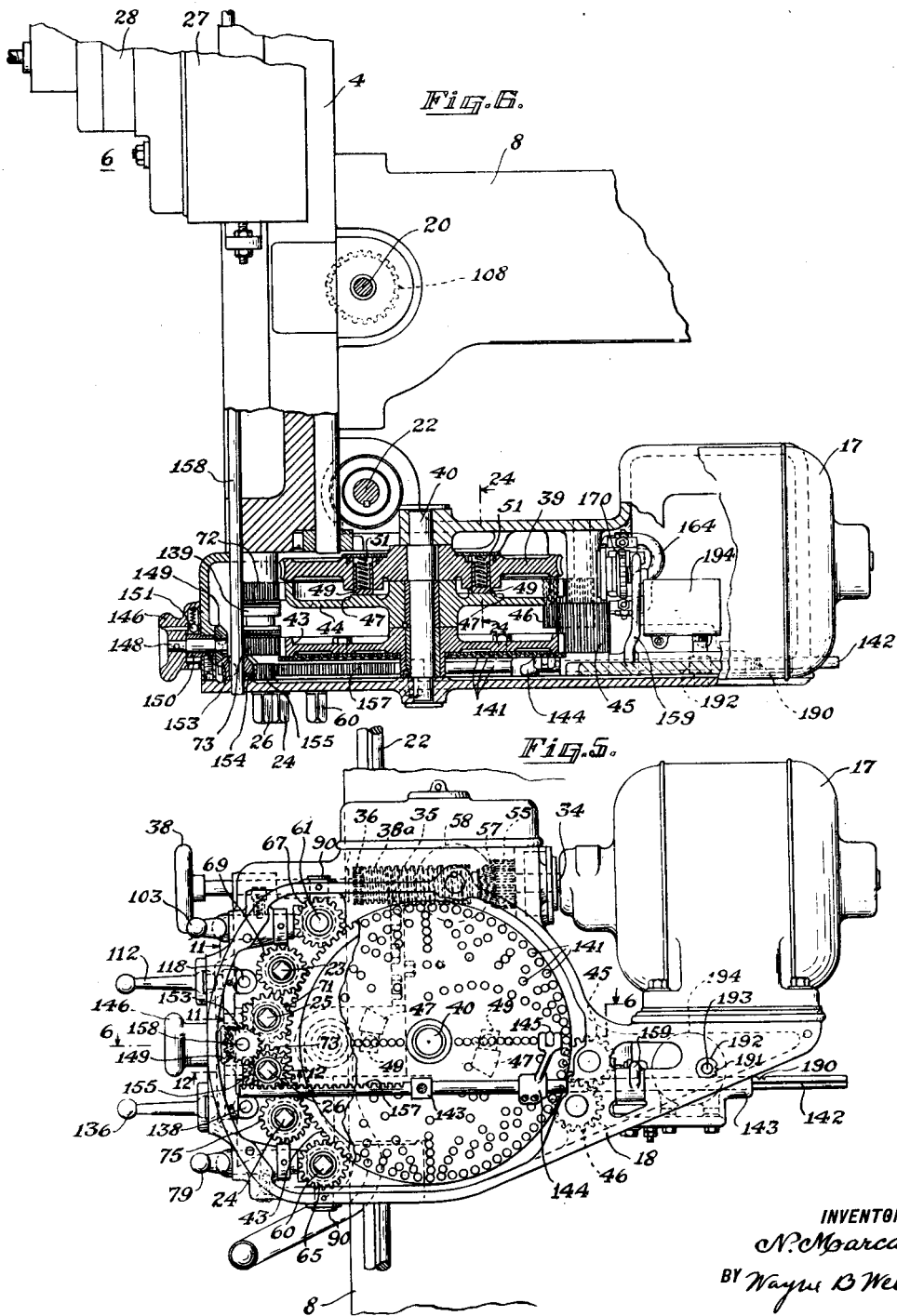

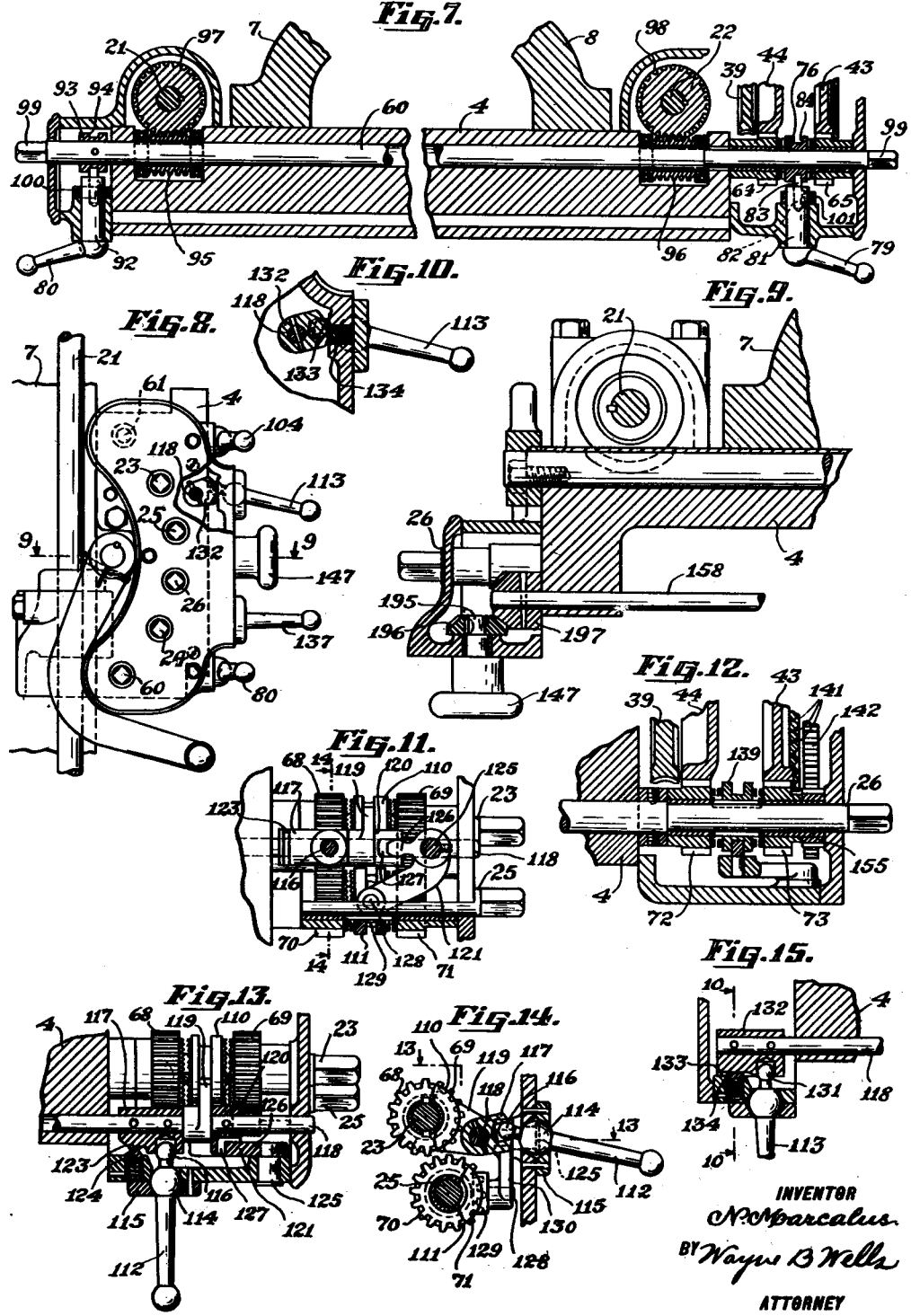

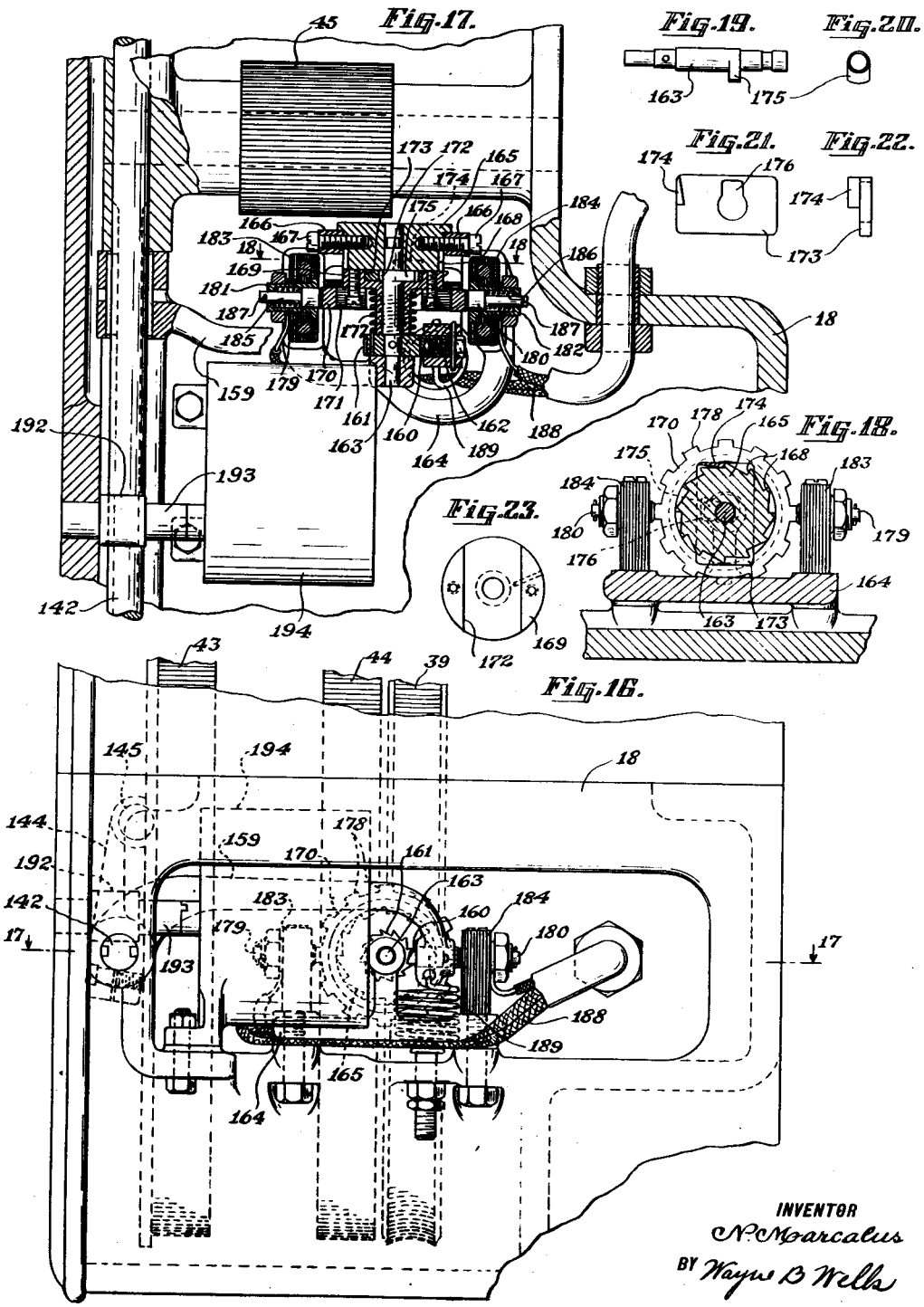

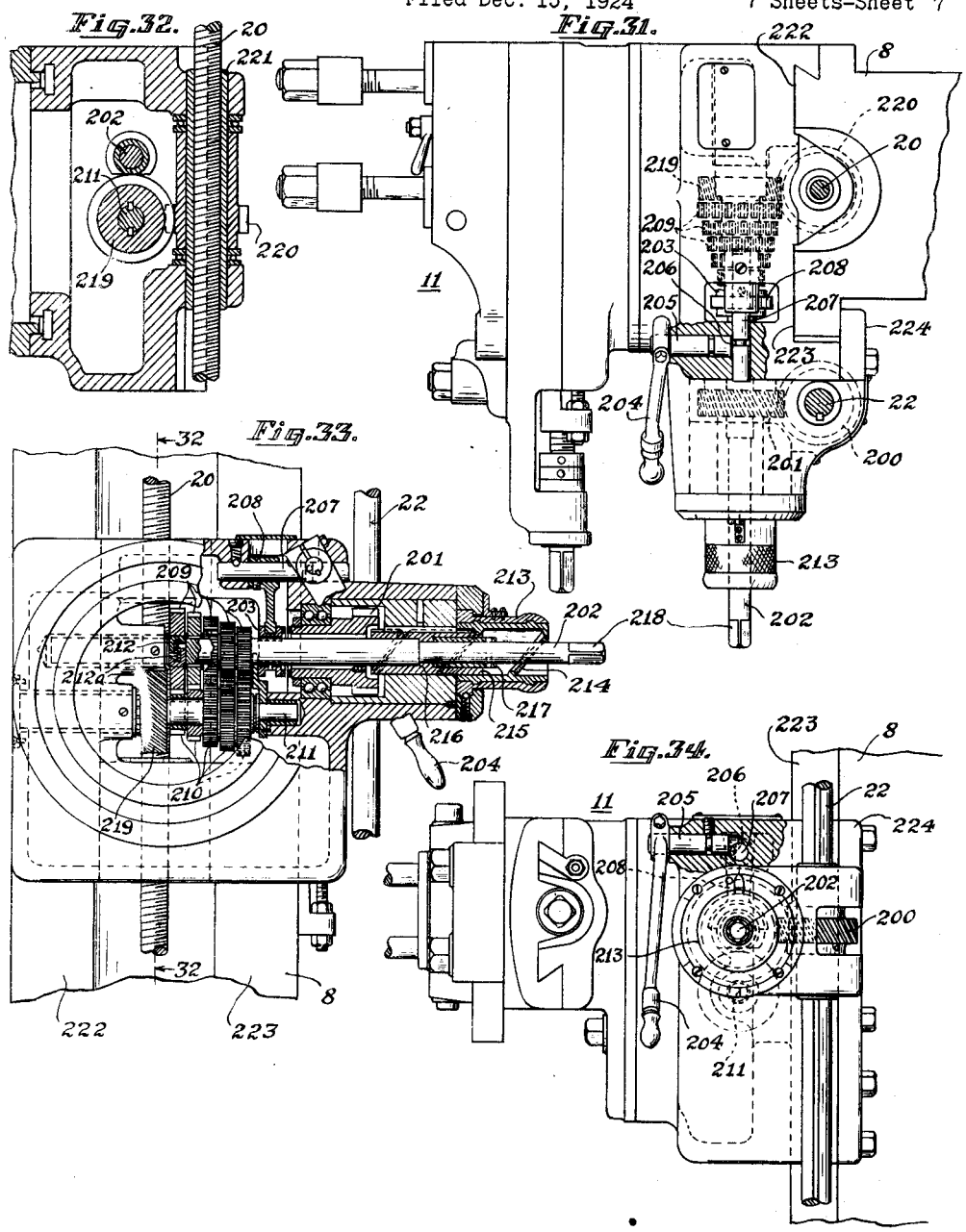

Patented June 26, 1928.

1,674,976

UNITED STATES PATENT OFFICE.

NICHOLAS MARCALUS, OF PLAINFIELD, NEW JERSEY, ASSIGNOR TO NILES-BEMENT-POND COMPANY, OF NEW YORK, N. Y., A CORPORATION OF NEW JERSEY.

PLANER-CONTROL MECHANISM.

Application filed December 15, 1924. Serial No. 756,054.

My invention relates to control mechanisms for machine tools and particularly to feed mechanisms for planers.

One object of my invention is to provide a planer feed mechanism that shall have a duplex control so that all movements of the cross rail and feeding and traversing movements may be controlled from the front and from the rear of the planer.

Another object of my invention is to provide a planer feed mechanism of the above indicated character that shall be provided with a duplex control for controlling the side heads from the front and from the rear of the planer and that shall vary the feeding rate of the side heads with respect to the feeding rate of the tool heads on the cross rail as desired.

Another object of my invention is to provide a feed mechanism that shall effect small feeding movements at one rate and large feeding movements at a different rate and that shall effect traverse movements at either a fast or a slow rate.

Another object of my invention is to provide a planer feed mechanism that shall have a slow and a fast hand feed control for operating all parts of the feed mechanism at will.

Another object of my invention is to provide a planer feed mechanism that shall provide each tool head with a single lever located at the front of the planer for controlling all movements of the tool head and a similar lever located at the rear of the planer for controlling all movements of the head.

Another object of my invention is to provide a planer feed mechanism that shall have a single control lever for each tool head to control the movements of the head along the cross rail and to control the vertical movements of the tool head, the direction of movement of the tool head being indicated by the direction in which the lever points.

A further object of my invention is to provide a planer feed mechanism that shall permit the feed mechanism to be controlled either from the front or from the rear of the planer and that shall permit the changing of the feed mechanism when the planer is in any operative position.

In planer feed mechanism heretofore constructed, it has been customary to effect feeding and traversing movements either mechanically through various gear and ratchet mechanisms or to effect feeding movements by a motor which is mounted on the arch of the planer. In either of such methods of controlling the feeding and traversing movements, the operator has a limited control of the operations.

In the feed mechanism constructed in accordance with my invention, a motor, which is mounted on the cross rail, controls the feeding and traversing movements of the cutting tools on the tool heads, raising and lowering the cross rail, and the movements of the side heads. The motor is operated in one direction to effect feeding and traversing movements at one rate and is operated in a reverse direction to effect feeding and traversing movements at a different rate of speed. The system for controlling the motor is disclosed and claimed in a companion application of Robert C. Deale, Serial No. 758,680 filed December 29, 1924. The traversing operation of the feed motors is also disclosed in this companion application to which reference may be made. The traversing operation of the feed motor is controlled by push buttons which may be located at any convenient place on the planer. Preferably such push buttons are located at the front and the rear of the planer so that duplex control of the traversing movement may be effected.

When the feed mechanism is set to effect a relatively small feed, feeding movement is not effected at a high speed. However, when the feeding mechanism is set to effect a relatively large feed, the movement is effected at a relatively rapid speed. Moreover, the traversing movement may be effected at a fast rate, which in many cases substantially eliminates the need of a hand feed. However, it may be noted that hand feeding may be effected at a relatively rapid rate or at a slow rate as desired.

The planer is provided with a duplex control so that all movements of each tool head on the rail, all movements of the side heads, and the movements of the rail may be controlled either from the front or from the rear of the planer. A single lever is provided at the front and at the rear of the planer for controlling the raising and the lowering of the cross rail and a lever is provided at the front and at the rear of the planer for controlling not only the move- The feed motor 17 not only controls the feeding and the traverse movements of the tool heads 5 and 6 and the side heads 10 and 11 but also controls the raising and lowering of the cross rail 4 on the uprights 7 and 8. Two stationary screw shafts 19 and 20, which are fixedly supported in the uprights 7 and 8, serve not only to raise and lower the cross rail 4 but also to effect vertical movement of the side heads 10 and 11. Two spline shafts 21 and 22, which are respectively supported in the uprights 7 and 8, are operated by the feed motor 17 for effecting vertical movement of the side heads 10 and 11. The cross rail 4 carries two screw shafts 23 and 24 which respectively effect movement of the tool heads 6 and 5 along the rail. Two spline shafts 25 and 26, which are mounted on the cross rail, respectively effect vertical movement of the tool slides 28 and 31 carried by the tool heads 6 and 5.

The tool head 6 comprises a saddle 27, which is moved along the cross rail by rotation of the screw shaft 23, and a slide 28 which is raised and lowered upon rotation of the spline shaft 25. The slide 28 carries a suitable cutting tool 29. The tool head 5 comprises a saddle 30, which is moved along the rail 4 upon rotation of the screw shaft 24, and a slide 31 which is raised and lowered according to the rotation of the spline shaft 26. A suitable cutting tool 32 is carried by the slide 31. A suitable pendent switch 33, which is carried by the arch 9, is provided for governing the operation of the motors 12 and 17 as set forth in the companion application of Robert C. Deale Serial No. 758,680.

The feed motor 17 is provided with an armature shaft 34 upon which is mounted a worm member 35, a gear wheel 36, a clutch gear wheel 37, and a feed knob 38, as shown in Figs. 4 and 5 of the drawings. The gear wheel 36 is keyed to the armature shaft 34 and serves to operate an oil system in the manner disclosed in my companion application Serial No. 755,754. The worm member 35 is splined to the armature shaft 34 and is normally held in an extreme position by means of a spring member 38ª which is disposed on the armature shaft between the gear wheel 36 and the worm member.

The worm member 35 meshes with a worm wheel 39 which is rotatably mounted on a shaft 40. One end of the worm member is provided with clutch teeth 41 which are adapted to engage similar clutch teeth 42 on the gear wheel 37, as best shown in Fig. 4 of the drawings. The clutch teeth 41 and 42 are so shaped as to compel the gear wheel 37 to rotate with the worm member 35 when the motor is rotated in a predetermined direction. The worm member 35, which is splined to the armature shaft, is always rotated in accordance with the rotation of the motor 17 whereas the gear wheel 37 is only rotated when the motor is rotated in a predetermined direction.

Two feed gear wheels 43 and 44 are mounted on the shaft 40, as shown in Figs. 4, 5, 6 and 26 of the drawings. The gear wheels 43 and 44 serve to rotate the shafts 23, 24, 25 and 26 in a forward and in a reverse direction for controlling the movement of the cross rail and the feeding and the traversing movements of the tool heads and the side heads. The two feed gear wheels 43 and 44 are connected together by means of two pinions 45 and 46. The pinion 46 meshes with the gear wheel 44 and the pinion 45 meshes with the gear wheel 43 and the pinion 46. Thus, it is apparent the two gear wheels 43 and 44 are always rotated in reverse directions with respect to each other.

The feed gear wheel 44, which is mounted on the shaft 40 adjacent to the worm wheel 39, carries two projecting lugs 47, as best shown in Figs. 5 and 24 of the drawings. The lugs 47 are each provided with a shoulder 48 which is adapted to be engaged by a plunger 49. Each plunger 49 is mounted in a recess 50 formed in the worm gear wheel 39 and is forced into engagement with the feed gear wheel 44 by means of a spring member 51. Each of the lugs 47 is provided with an inclined surface 52 and each of the plungers is provided with an inclined surface 53 so positioned that the plungers 49 will slide freely over the lugs 47 when the worm wheel 39 is rotated in a predetermined direction. If the worm wheel 39 is rotated in a clockwise direction, as shown in Fig. 5, the plungers 49 engage the shoulders 48 on the feed gear wheel 44 to compel the two feed gear wheels 44 and 43 to rotate at a relatively slow speed. As before set forth the feed gear wheels 43 and 44 rotate in reverse directions with respect to each other.

A second connection is provided between the feed motor 17 and the feed gear wheels 43 and 44 for rotating the feed gear wheels 43 and 44 at a relatively rapid rate. The second connection between the feed gear wheels and the feed motor comprises a gear wheel 55 which is mounted on a short shaft 56. The gear wheel 55 meshes with the gear wheel 37 which is mounted on the armature shaft 34, as best shown in Fig. 4 of the drawings. Bevel gear teeth 57 are formed on the gear wheel 55 which mesh with the teeth on a bevel gear wheel 58. The bevel gear wheel 58 is provided with spur gear teeth 59 which mesh with the teeth on the feed gear wheel 43. The second connection between feed motor 17 and the feed gear wheels 43 and 44 operates the feed gear wheels 44 and 43 in the same direction as the the first connection but at a higher rate of speed.

It should be noted that when the motor is operated in one direction, the feed gear wheels 43 and 44 are operated through the worm member 35, the worm gear wheel 39, and the clutch mechanism which comprises the plungers 53 on the worm gear wheel and the lugs 47 on the feed gear wheel 44. If the direction of rotation of the feed motor 17 is reversed, the clutch connection between the worm wheel 39 and the feed gear 44 is rendered inoperative and the clutch teeth 41 and 42 between the worm member 35 and the gear wheel 37 serve to connect the feed gear wheel 43 to the motor. The operation of the feed motor 17 in a forward and in a reverse direction is disclosed and described in the companion application of Robert C. Deale Serial No. 758,680.

The cross rail 4 also carries two shafts 60 and 61 which respectively control the side heads 10 and 11 and the raising and lowering of the cross rail 4. The shafts 60, 61, 23, 24, 25 and 26 each carry two pinions which respectively mesh with the two feed gears 43 and 44. The two pinions 64 and 65, which are mounted on the shaft 60, are shown in Fig. 7 of the drawings. Two pinions 66 and 67, which are mounted on the shaft 61, are shown in Fig. 4 of the drawings. The two pinions 68 and 69, which are mounted on the shaft 23, are shown in Figs. 11 and 13 of the drawings. The two pinions 70 and 71, which are mounted on the shaft 25 are shown in Fig. 11 of the drawings. The two pinions 72 and 73, which are mounted on the shaft 26 are shown in Fig. 12 of the drawings. Only one pinion 75, which is mounted on the shaft 24 is shown on the drawings. The pinion 75 meshes with the feed gear wheel 43, as shown in Fig. 5 of the drawings. The pinions 64, 66, 68, 70 and 72 mesh with the feed gear wheel 44. The pinions 65, 67, 69, 71, 73 and 75 mesh with the feed gear wheel 43. The pairs of pinions are loosely mounted on the shafts 60, 61, 23, 24, 25 and 26 and are adapted to be connected to the shafts by means of clutch members which are disposed between them.

Referring to Fig. 7 of the drawings, a clutch member 76 is shown in position between the pinions 64 and 65. The clutch member 76 is splined to the shaft 60 and is provided with clutch teeth which are adapted to cooperate with similar clutch teeth on the pinions 64 and 65. If the clutch member 76 is moved into engagement with the pinion 64, the shaft 60 is rotated in one direction by means of the feed gear wheel 44. If the clutch member 76 is moved in an opposite direction into engagement with the pinion 65, the shaft 60 is rotated in a reverse direction by means of the feed gear wheel 43. A similar clutch member is mounted on each of the shafts 61, 23, 24, 25 and 26.

The shaft 60, which effects movement of the side heads 10 and 11 by means of the shafts 22 and 21, may be shifted longitudinally in the rail 4. The longitudinal movement of the shaft 60 is effected either by means of an operating lever 79 at the front of the planer or by a lever 80 at the rear of the planer. The clutch member 76 is fixedly connected to the shaft 60 in any suitable manner, as by means of set screws, so that shifting of the shaft 60 in one direction or the other serves to connect one of the pinions 64 and 65 to the shaft. The movement of the clutch member 76 and the shaft 60 by the lever 79 is best illustrated in Figs. 7, 27, 28 and 29, of the drawings. The lever 79 is mounted on a trunnion stud 81, and has a suitable bearing in the casing or bracket 18 which supports the feed mechanism. A pin 82, which is eccentrically mounted in the end of the stud 81, carries a block 83 which is fitted to a groove 84 formed in the clutch member 76. By reason of the eccentric mounting of the pin 82 in the stud 81, it is apparent a movement of rotation of the lever 79 serves to shift the clutch member 76 into engagement with one of the pinions 64 and 65. The mechanism is so arranged that if the lever 79 is moved to point upwardly, the feeding of the side heads is effected upwardly and if the lever is pointed downwardly, the feeding of the side heads is effected downwardly. The stud 81 is provided with three notches 85, 86 and 87 which are engaged by a spring pressed ball 88 to accentuate the positions of the stud. The ball 88 is forced into engagement with the stud by means of a spring member 89. In Fig. 29 of the drawings, the stud 81 is shown in the neutral position and with the clutch member 76 out of engagement with both of the pinions 64 and 65.

A clutch block 90, shown in Figs. 5, 27, and 30 of the drawings, is provided for holding the pinions 64 and 65 against any axial movement during the shifting of the shaft 60 and the clutch member 76. The clutch block 90 projects through the bracket or casing 18 and is provided with a ridge 91 which engages a side of one of the gear wheels to prevent the gear wheel from moving with the shaft 60.

The operating lever 80 at the rear of the planer is mounted on a trunnion stud 92, which is similar in construction to the trunnion stud 81 at the front of the planer. The trunnion stud 92 effects movement of the shaft 60 by means of a collar member 93 which is pinned to the shaft. The collar member 93 is provided with a groove 94 in which is fitted a block member that is operated by the trunnion stud 92. Thus it is apparent a movement of rotation of the operating lever 80 serves to effect longitudinal movement of the shaft 60 and accordingly movement of the clutch member 76 into engagement with one of the pinions 64 and 65. The operating lever 80 indicates the direction of feeding movement effected by the side heads in the same manner as the operating handle 79.

Two worm members 95 and 96, which are splined to the shaft 60, mesh with two worm wheels 97 and 98. The worm wheels 97 and 98 are splined to the two shafts 21 and 22. From the above description it is apparent the shafts 21 and 22, which operate the side heads, may be rotated in a clockwise or a counter-clockwise direction by selectively operating either the lever 80 at the rear of the planer or the lever 79 at the front of the planer. If so desired, the shaft 60 may be rotated manually by means of a crank which may be fitted to the squared ends 99 of the shaft. The trunnion studs 92 and 81 are held in position against longitudinal movement in the rail 4 by means of collar members 100 and 101.

The shaft 61 is operated in a manner similar to the operation of the shaft 60 for raising and lowering the cross rail 4. A clutch member 102 is pinned to the shaft 61 between the two pinions 66 and 67 as best shown in Fig. 4 of the drawings. The clutch member 102 is controlled by a lever 103 at the front of the planer and a lever 104 at the rear of the planer. The levers 104 and 103 effect shifting of the clutch member 102 and of the shaft 61 in the same manner as the levers 80 and 79 effect operation of the clutch member 76 and the shaft 60. The mechanism is so arranged that the levers 104 and 103 indicate the direction of movement that will be effected by the cross rail. If the lever 103 or the lever 104 is moved to point upwardly, the cross rail 4 will be moved upwardly and in the same manner, if lever 103 or the lever 104 is moved to point downwardly, a downward movement of the cross rail will be effected. Two worm members 105 and 106, which are splined to the shaft 61, mesh with two worm wheels 107 and 108. The worm wheels 107 and 108 are fitted to the screw shafts 19 and 20 and operate as nuts for raising and lowering the cross rail.

A clutch member 110, shown in Fig. 11 of the drawings, is mounted on the screw shaft 23 between the pinions 68 and 69 and a similar clutch member 111 is mounted on the spline shaft 25 between the pinions 70 and 71. The clutch members 110 and 111 are respectively splined to the shafts 23 and 25 and are similar in construction to the clutch member 76 which is mounted on the shaft 60. The clutch member 110 connects the pinion 68 to the shaft 23 for effecting movement of the tool head 6 in one direction along the rail 4 and connects the pinion 69 to the screw shaft 23 for effecting movement of the tool head 6 in an opposite direction along the rail 4. The clutch member 111 serves to connect the two pinions 70 and 71 to the spline shaft 25 for raising or lowering the tool slide 28 on the tool head 6.

The two clutch members 110 and 111, which effect movement of the tool head 6, are controlled by a single lever 112 at the front of the planer and a single lever 113 at the rear of the planer. The lever 112 is provided with a spherical portion 114 which is partially surrounded by a cover 115 in order to permit universal movement of the lever. The lever 112 is moved in a horizontal direction to the right or to the left for controlling the clutch member 110 to effect movement of the tool head 6 along the rail and is moved upwardly or downwardly in a vertical direction to control the clutch member 111 for raising or lowering the slide 28 on the tool head 6.

A spherical portion 116, which is formed on the end of the lever 112, is fitted to a hole formed in a shifting block 117. The shifting block 117 is pinned to a shifting rod 118, which extends across the cross rail 4. The ball and socket connection between the shifting block 117 and the lever 112 effects shifting movement of the rod 118 when the lever 112 is moved in a horizontal direction and effects rotative movement of the rod 118 when the lever 112 is operated in a vertical direction. A yoke member 119, which is fitted to the groove formed in the clutch member 110 is loosely mounted on the rod 118 between the shifting block 117 and a back shifting block 120. The back shifting block 120, which is pinned to the rod 118, operates a clutch lever 121, upon rotative movement of the rod 118, to effect movement of the clutch member 111. The operation of the clutch member 111 by means of the rod 118 will be described hereinafter.

Referring particularly to Figs. 11, 13 and 14 of the drawings, it is apparent movement of the lever 112 to the right or to the left in a horizontal direction serves to move the rod 118 in an axial direction. Such movement of the rod 118 serves to move the clutch member 110 into engagement with the pinion 68 or the pinion 69. The connection of one of the pinions 68 and 69 to the screw shaft 23 serves to rotate it in a forward or a reverse direction. Such rotation of the screw shaft 23, as before set forth, effects movement of the tool head 6 along the cross rail. The mechanism is so adjusted that movement of the lever 112 to point toward the right effects movement of the tool head towards the right, and movement of the lever 112 to point towards the left effects movement of the tool head 6 towards the left. Notches 123, which are formed in the shifting block 117, as shown in Fig. 13 of the drawings, are engaged by a spring pressed plunger 124 to accentuate the longitudinal position of the rod 118.

The clutch lever 121, which is operated by the back shifting block 120, is pivotally mounted on a stud 125, as best shown in Fig. 13 of the drawings. An arm 126 of the clutch lever 121 projects into a slot 127 which is formed in the back shifting block 120. Thus, rotative movement of the rod 118 and of the back shifting block 120 serves to effect a rotative movement of the clutch lever 121 on the stud 125. A pin 128, which carries a block 129, is mounted in a second arm 130 of the clutch lever 121. The block 129 is fitted to the groove, which is formed in the clutch member 111. Thus rotative movement of the clutch lever 121 serves to shift the clutch member 111 into engagement with one of the pinions 70 and 71. Accordingly, it is apparent the vertical movement of the lever 112 serves to effect rotative movement of the rod 118 and the clutch lever 121 for selectively controlling the clutch member 111. The clutch member 111, as heretofore set forth, serves to rotate the spline shaft 25 to raise or lower the slide 28 on the tool head 6. The mechanism is so arranged that if the lever 112 is moved to point upwardly, the slide 28 is moved upwardly and if the lever is moved to point downward the slide 28 is moved downwardly.

The rod 118, which extends across the rail 4, may be given a movement of rotation or may be shifted longitudinally by means of the lever 113 which is located at the rear of the planer. The lever 113, as best shown in Figs. 10 and 15 of the drawings, is similar in construction to the lever 112 and is provided with a spherical end portion 131, which is fitted to a hole formed in a block 132. The block 132 is pinned to the rod 118 and accordingly the lever 113 can effect movement of the rod 118 in the same manner as the lever 112 effects movement of the rod 118. The block 132 is provided with slots 133 which are parallel to the rod 118 and which are adapted to be engaged by a spring pressed plunger 134. The spring pressed plunger 134 engaging in the slots 133 serves to accentuate the rotative positions of the rod 118 when the clutch member 111 is being controlled either by the lever 112 or the lever 113. The lever 113 indicates the direction of movement of the slide 28 or the direction of movement of the tool head 6 in the same manner as the lever 112. Each end of the shafts 23 and 24 are squared to permit the manual rotation of such shafts by means of a suitable crank lever.

The screw shaft 24 and the spline shaft 26, which effect movement of the tool head 5 along the rail 4 and of the slide 31 on the tool head, are controlled in the same manner as the shafts 23 and 25 which operate the tool head 6. A lever 136 is located at the front of the planer and a lever 137 is located at the rear of the planer for controlling a shifting rod 138. The rod 138 controls a clutch member 139 which is mounted on the shaft 26, as shown in Fig. 12 of the drawings, and a similar clutch member, (not shown) which is mounted on the screw shaft 24. The operation of the two clutch members on the shafts 24 and 26 by the rod 138 under the control of the levers 136 and 137, is exactly the same as the operation of similar clutch members on the shafts 23 and 25. Accordingly, a further description of the operation of such clutch members is deemed unnecessary.

The screw shafts 23 and 24 are connected to the saddles 27 and 30 in accordance with usual planer practice and the spline shafts 25 and 26 are connected to the slides 28 and 31 in accordance with usual planer practice. Inasmuch as the connection between the tool heads and such shafts is old and well-known, it was deemed unnecessary to illustrate and describe such connections in this application.

The mechanism for effecting changes in the feeding movements of the motor 17 is best illustrated in Figs. 4, 5, 6, 12, 16, 17 and 18 of the drawings. The feed gear wheel 43 has a number of series of depressions 141 formed on the outside surface thereof as indicated in Figs. 5 and 6 of the drawings. The depressions 141 are arranged in series differently spaced in order to control the operation of the feed motor. The feeding movement of the feed motor 17 is initiated by the pilot switch 13 in the manner disclosed in the companion application of Robert C. Deale Serial No. 758,680. The circuit of the motor 17 is opened in accordance with the location of the series of depressions 141. The depressions formed in the gear wheel 43 operate in the manner of the usual limit switch on planers.

A rod 142, which is rotatably and slidably mounted in bearings 143 adjacent the face of the feed gear wheel 43, carries a control arm 144. The control arm 144 is fixedly mounted on the rod 142 and carries a roller 145. The roller 145 is adapted to enter the depressions 141 formed in the gear wheel 43. The control arm 144 is normally under a force tending to rotate it towards the gear wheel 43 and accordingly whenever the roller 145 enters a depression 141 the rod 142 is given a small movement of rotation. Such movement of rotation of the rod 142 is utilized for opening the circuit of the feed motor 17 as will be hereinafter set forth.

The rod 142 is moved longitudinally across the face of the gear wheel 43 in order to bring the roller 145 into cooperation with the various series of the depressions 141 and accordingly vary the feeding movements. The rod 142 is moved by means of a feed knob 146 at the front of the planer and a similar feed knob 147 at the rear of the planer. The feed knob 146 is fixedly mounted on a short shaft 148 which also carries a bevel gear wheel 149. The shaft 148 is surrounded by a stationary bushing 150 having ridges formed therein. A spring pressed ball 151, which is mounted in the feed knob 146, engages the ridges in the bushing 150 to accentuate the positions of the feed knob. The ridges in the bushing are formed in accordance with the various feeding positions of the control arm 144. Preferably, a scale 152 is formed on the front of the feed mechanism, as shown in Fig. 3 of the drawings, to indicate the rate of feeding movements. The bevel gear wheel 149 meshes with a bevel gear wheel 153. The bevel gear wheel 153 is provided with spur gear teeth 154 which mesh with a spur gear wheel 155 loosely mounted on the shaft 26, as shown in Figs. 6 and 12 of the drawings. The gear wheel 155 meshes with rack teeth 157 which are formed on the rod 142. Thus it is apparent movement of the feed knob 146 serves to vary the position of the control arm 144 and the roller 145 with respect to the depressions 141 formed in the gear wheel 43. The bevel gear wheel 153 is mounted on a rod 158 which extends across the cross rail 4 in order to permit control of the feed mechanism by the feed knob 147 at the rear of the planer. The feed knob 147 at the rear of the planer operates the rod 158 in the same manner as the knob 146 located at the front of the planer. The feed knob 147 is secured to a shaft 195 which also carries a bevel gear wheel 196. The bevel gear wheel 196 meshes with a bevel gear wheel 197, as shown in Fig. 9 of the drawings. The bevel gear wheel 197 is pinned to the rod 158. A scale 198, as shown in Fig. 3 of the drawings, is preferably mounted on the rail for indicating the feeds effected according to the position of the knob 147.

Referring particularly to Figs. 16 and 17 of the drawings, a switch arm 159 is shown splined to the rod 142. The switch arm 159 carries a pawl 160 which is resiliently held in engagement with a ratchet wheel 161 by means of a spring member 162. The ratchet wheel 161 is pinned to an eccentric shaft 163. The eccentric shaft is provided with a bearing in a switch frame 164 and a second bearing in a stationary ratchet wheel 165. The stationary ratchet wheel 165 is secured to two upwardly extending lugs 166 on the frame 164 by means of screws 167. The stationary ratchet wheel 165 is provided with teeth 168.

A shoe member 169, which is rotatably mounted on the eccentric shaft 163, carries a contactor disc 170. Suitable insulating material 171 is mounted on the contactor disc 170 for insulating the shoe member from the contactor. A guide way or slot 172 is formed in the shoe member 169 for receiving a slide 173. The slide 173 is provided with a projecting lug 174 which engages the teeth 168 on the stationary ratchet 165. The eccentric shaft 163 is provided with a projecting lug 175 which is fitted to a slot 176 formed in the slide 173. It is apparent, if the eccentric shaft 163 is given a rotative movement while the shoe member 169 is held stationary, the slide 173 will be moved in the slot 172. A spring member 177 which surrounds the hob portion of the shoe member 169 has one end fixedly connected to the ratchet wheel 161 and the other end thereof fixedly connected to the shoe member 169.

The contactor 170 is provided with a number of teeth 178 which are adapted to be engaged by contact members 179 and 180. The contact members 179 and 180 are respectively mounted in sleeve members 181 and 182 which are in turn mounted on insulating blocks 183 and 184. The insulating blocks 183 and 184 are suitably secured to the switch frame 164. Spring members 185 and 186 are disposed within the sleeve members 181 and 182 for exerting a force tending to move the contact members 179 and 180 into engagement with the contactor 170. Suitable pins 187 are secured to the contact members for limiting their inward movement toward the contactor 170. Suitable connectors may be mounted on the sleeve members 181 and 182 for securing electric conductors 188 thereto.

Assume the gear wheel 43 to be moved so that the roller 145 on the contact arm 144 is not in one of the depressions 141 and the eccentric shaft 163 and the contactor 170 to be in the position shown in Figs. 17 and 18 of the drawings. Further movement of the gear wheel 143 allows the roller 145 to enter one of the depressions 141. Upon movement of the roller 145 into one of the depressions, the arm 159 is given a movement of rotation in a clockwise direction, as shown in Fig. 16 of the drawings. The roller 145 is forced into one of the depressions 141 by means of a spring member 189, which is secured to the end of the arm 159, as shown in Fig. 16 of the drawings. When the arm 159 is given a movement of rotation by the roller 145 entering a depression 141, the pawl 160 on the arm 159 engages one tooth on the ratchet wheel 161 and compels the ratchet wheel and the eccentric shaft 163 to effect a rotative movement in a clockwise direction. The rotative movement of the ratchet wheel 161 places the spring member 177 under tension and accordingly exerts a force tending to rotate the contactor 170 in a clockwise direction. Rotative movement of the contactor 170 is prevented, however, by the lug 174 on the slide 173, which is in engagement with one of the teeth 168 on the stationary ratchet 165. However, the movement of rotation of the eccentric shaft 163 operates the slide 173 in the guideway 172 to separate the lug 174 from a tooth on the ratchet 165. When the lug 174 is out of engagement with the ratchet 165, the contactor 170 is free to effect a movement of rotation in a clockwise direction. The shoe 169, which is secured to the contactor 170, effects movement of the slide 173. The rotative movement of the slide with respect to the eccentric shaft 163 compels movement of the slide in the guideway 172 so as to move the lug 174 into engagement with the next tooth on the ratchet 165. The movement of the slide 173 in the guideway 172 is effected by means of the lug 175 which projects from the eccentric shaft 163. The tension on the spring 177 may be so adjusted as to effect movement of the contactor step by step in the above indicated manner.

In one of the companion applications above referred to is disclosed the complete electrical system for operating the feed motor. However, a brief description will be given of the function performed by the switch mechanism shown in Figs. 16, 17 and 18 of the drawings. The switch mechanism shown in Figs. 16, 17 and 18 of the drawings serves only for completing a holding circuit for operating the feed motor. Upon movement of the contactor 170 to disconnect it from the contact members 179 and 180, the holding circuit is opened to stop the operation of the feed motor. Such holding circuit is completed at one end of the stroke of the planer by the pilot switch 13, and, at the other end of the stroke of the planer the pilot switch completes a circuit for operating the feed motor. In brief, the operation of the electric system consists in preparing a circuit for operating the feed motor at one end of the stroke of the planer, in operating the feed motor at the opposite end of the planer stroke and in opening the motor circuit by means of the switch mechanism disclosed in Figs. 16, 17 and 18 of the drawings.

The longitudinal movement of the rod 142 to vary the position of the roller 145 relative to the disk 43 also serves to control the direction of rotation of the feed motor 17 and thus control the speed of the feeding movements. A single tooth 190 on the rod 142, as shown in Fig. 5 of the drawings, is adapted to engage two teeth 191 which are formed on a drum switch gear 192 so that longitudinal movement of the rod 142 oscillates the gear 192. The drum switch gear 192 is mounted on a shaft 193 which operates the drum switch 194. The drum switch 194 serves to reverse the direction of rotation of the motor 17. The tooth 190 on the rod 142 is so positioned as to effect the smaller feeding movements at a relatively slow rotative speed of motor 17 and to effect the larger feeding movements at a relatively rapid speed.

The two side heads 10 and 11 are similar in construction and operation and accordingly only one side head, namely, the side head 11 will be described in detail. Referring to Figs. 31, 32, 33 and 34, a spiral gear wheel 200, which is splined to the shaft 22, meshes with a spiral gear wheel 201 which is rotatably mounted on a shaft 202. The spiral gear wheel 200 is rotatably supported on the tool head 11 which in turn is supported on the upright 8. The tool head 11 slides on guideways 222 and 223 as shown in Fig. 31 of the drawings. A suitable strap 224 is provided for holding the tool head in position. A clutch member 203, which is splined to the shaft 202, is provided with clutch teeth which engage similar clutch teeth on the hub of the gear wheel 201. The clutch member 203 is operated by a hand lever 204, which is mounted on a trunnion stud 205 for connecting the gear wheel 201 to the shaft 202. The trunion stud carries an eccentrically mounted pin 206 which is fitted to a slot formed in a rod 207. By reason of the eccentric mounting of the pin 206, it is apparent operation of the handle 204 effects axial movement of the rod 207. The rod 207 carries a yoke member 208 which is fitted to a groove on the clutch member 203.

A set of gear wheels 209 of varying diameters, which are mounted in the shaft 202, mesh with gear wheels 210 of varying diameter which are mounted on a shaft 211. The gear wheels 210 are fixedly mounted on the shaft 211 whereas the gear wheels 209 are adapted to be connected to the shaft 202 by means of a sliding key 212. The sliding key 212 is forced by a spring 212ª into engagement with the gear wheels 209. Axial movement of the shaft 202 serves to move the sliding key 212 so as to selectively connect one of the gear wheels 209 to the shaft 202. Thus, the rate of rotation of the shaft 211 is varied in accordance with the gear wheel 209 which is rendered operative by the sliding key 212. A feed adjusting nut 213 is provided with a thread 214 which meshes with a similar thread on a bushing 215. The bushing 215 is mounted on the shaft 202 and is held in position between a shoulder 216 on the shaft and a collar 217 which is pinned to the shaft 202. Thus, it is apparent rotative movement of the feed adjusting nut 213 compels axial movement of the shaft 202 and accordingly selectively moves the sliding key 212 into engagement with the gear wheels 209. The shaft 202 is provided with a squared end 218 so that the side head may be moved manually by means of a suitable lever when desired and when the clutch member 203 is out of engagement with the gear wheel 201.

A gear wheel 219 which is mounted on the shaft 211 meshes with a spiral gear wheel 220 which is fixedly mounted on a nut 221. The nut 221 is fitted to the screw shaft 20. Accordingly, rotation of the gear wheel 220 and the nut 221 in one direction or the other serves to raise or lower the side head.

In the above described construction, it should be noted the spline shaft 22 can be controlled by the feed mechanism mounted on the rail 4 for effecting feeding movements or traversing movements of the side heads 10 and 11 at the same rate as such movements are effected by the tool heads 5 and 6 on the cross rail. However, if desired, it is possible to vary the movement of a side head with respect to the tool heads by operating the feed adjusting nut 213. Thus, the two side heads, which are mounted on the planer, may effect feeding movements at the same rate as the tool heads or may effect feeding movements at any desired ratio with respect to the movements of the tool heads. It is also apparent that the side heads may effect feeding movements at different rates with respect to each other.

Modification in the mechanism and in the arrangement and location of parts may be made within the spirit and scope of the invention and such modifications are intended to be covered by the appended claims.

What I claim is:

1. In a feed mechanism for planers having a tool head movable thereon, the combination comprising a motor, two feed gear wheels rotatable in opposite directions, means for connecting said motor to the gear wheels to rotate them at one speed when the motor is operated in one direction and to rotate them in the same direction at a different speed when the motor is operated in a reverse direction, and means connecting said gear wheels to means for effecting movement of the tool heads on said planer.

2. In a planer feed mechanism, the combination with a motor, two feed gear wheels rotatable in opposite directions, and connecting means between said motor and the gear wheels for rotating the gears at one speed when the motor is operated in one direction and for rotating the gears in the same direction at a different speed when the motor is operated in a reverse direction, of a plurality of control shafts, two pinions rotatably mounted on each of said shafts and respectively meshing with said two gear wheels, and a clutch member mounted on each shaft between the two pinions for selectively connecting the pinions to the shaft.

3. In a planer feed mechanism, the combination with a motor, two feed gear wheels rotatable in opposite directions, and means for connecting said motor to the gear wheels to rotate them at one speed when the motor is operated in one direction and to rotate them in the same direction at a different speed when the motor is operated in a reverse direction, tools movably mounted on said planer, of shafts for effecting the feeding and traversing movements of the tools, and means for selectively connecting said shafts to the feed gear wheels.

4. In a planer feed mechanism having a tool head mounted on a cross rail and a side head, the combination with a motor, two feed gear wheels rotatable in opposite directions, and means for connecting said motor to the gear wheels to rotate them at one speed when the motor is operated in one direction and to rotate them in the same direction at a different speed when the motor is operated in a reverse direction, of a shaft for raising and lowering the cross rail, a shaft for moving the tool head on the cross rail, a shaft for raising and lowering the tool on the tool head, a shaft for controlling the side head, and means for selectively connecting said shafts to said feed gear wheels.

5. In a planer feed mechanism having a tool head mounted on a cross rail and a side head, the combination with a motor, two feed gear wheels rotatable in opposite directions, and means for connecting said motor to the gear wheels to rotate them at one speed when the motor is operated in one direction and to rotate them in the same direction at a different speed when the motor is operated in a reverse direction, of a shaft for raising and lowering the cross rail, a shaft for moving the tool head on the cross rail, a shaft for raising and lowering the tool on the tool head, a shaft for controlling the side head, pinions on each of said shafts meshing with said feed gear wheels, and toothed clutches for selectively connecting each pair of pinions to the shaft supporting them.

6. In a planer feed mechanism, the combination with a motor, two feed gear wheels connected to rotate in opposite directions, and means for connecting the motor to said gear wheels to rotate them at one speed when the motor is operated in one direction and to rotate them in the same direction at a different speed when the motor is operated in a reverse direction, of a shaft for effecting the feeding movements of the cutting tool, and means for selectively connecting said shaft to said feed gear wheels.

7. In a planer feed mechanism, the combination with a motor, two feed gear wheels connected to rotate in opposite directions, and means for connecting the motor to said gear wheels to rotate them at one speed when the motor is operated in one direction and to rotate them in the same direction at a different speed when the motor is operated in a reverse direction, of a shaft for effecting the feeding movements of the cutting tool, two pinions rotatably mounted on said shaft and respectively meshing with said feed gear wheels, and means for selectively connecting said pinions to said shafts.

8. In a planer feed mechanism, the combination with a motor, two feed gear wheels connected to rotate in opposite directions, and means for connecting the motor to said gear wheels to rotate them at one speed when the motor is operated in one direction and to rotate them in the same direction at a different speed when the motor is operated in a reverse direction, of a shaft for effecting the feeding movements of the cutting tool, two pinions rotatably mounted on said shaft and respectively meshing with said feed gear wheels, and means controlled from the front and from the rear of the planer for selectively connecting said pinions to said shaft.

9. In a planer feed mechanism, the combination with a power shaft rotatable in a forward and in a reverse direction, and two feed gear wheels, of mechanism for connecting the power shaft to the two feed gear wheels to rotate them at a predetermined speed when the power shaft is rotated in one direction and to rotate them in the same direction at a different speed when the power shaft is rotated in a reverse direction, tool heads movably mounted on said planer, and means connecting said gears to said tool heads whereby said heads may be moved at different speeds.

10. In a planer feed mechanism, the combination with a power shaft rotatable in a forward and in a reverse direction, two feed gear wheels, and gearing between the two feed gear wheels for causing them to rotate simultaneously and in opposite directions, of mechanism for connecting the power shaft to the two feed gear wheels to rotate them at a predetermined speed when the power shaft is rotated in one direction and to rotate them in the same direction at a different speed when the power shaft is rotated in a reverse direction, tool heads movably mounted on said planer, and means connecting said gears to said tool heads whereby said heads may be moved at different speeds.

11. In a planer feed mechanism, the combination with a power shaft rotatable in a forward and in a reverse direction, and a tool movable on said planer, of two feed gear wheels, gearing between the two feed gear wheels for compelling them to rotate simultaneously and in opposite directions, and mechanism for connecting the power shaft to the two feed gear wheels to rotate them at a predetermined speed when the power shaft is rotated in one direction and to rotate them in the same direction at a different speed when the power shaft is rotated in a reverse direction, of shafts for effecting feeding and traversing movement of the tool on the planer, and means comprising gearing for selectively connecting said shafts to said feed gear wheels.

12. In a planer feed mechanism for a planer having tool heads mounted on a cross rail and side heads, the combination with a power shaft rotatable in a forward and in a reverse direction, two feed gear wheels, gearing between the two feed gear wheels for compelling the gear wheels to rotate simultaneously and in opposite directions, and mechanism for connecting the power shaft to the two feed gear wheels to rotate them at a predetermined speed when the power shaft is rotated in one direction and to rotate them in the same direction at a different speed when the power shaft is rotated in a reverse direction, of shafts for operating the tool heads and the side heads and for raising and lowering the cross rail, and means comprising gearing for selectively connecting said shafts to said feed gear wheels.

13. In a feed mechanism for planers having a tool head movable thereon, the combination with a power shaft rotatable in a forward and in a reverse direction, a slow gear wheel, means for connecting said slow gear wheel with said shaft, two feed gear wheels mounted adjacent to said slow gear wheel, gearing connection between said feed gear wheels for rotating them together, and connecting means between said slow gear and the feed gears for rotating the latter from the slow gear when the slow gear is rotated in a predetermined direction by the power shaft and for permitting the feed gears to rotate independently of the slow gear when the direction of rotation of the latter is reversed, of a second connecting means between the feed gear wheels and the power shaft, said second connecting means serving to operate the feed gear wheels only when the power shaft is operating in a predetermined direction, and means selectively connecting said feed gear wheels to move said tool head.

14. In a feed mechanism for planers having a tool head thereon, the combination with a power shaft rotatable in a forward and in a reverse direction, a worm member mounted on and rotated with said power shaft, a worm wheel meshing with said worm member, two feed gear wheels mounted adjacent to said worm wheel, gearing connection between said feed gears for rotating them together and in opposite directions, and a clutch connection between said worm wheel and the feed gear wheels for rotating the feed gears from the worm wheel when the latter is rotated in a predetermined direction by the power shaft and for permitting the feed gear wheels to rotate independently of the worm wheel when the direction of rotation of the latter is reversed, of a clutch gear wheel rotatably mounted on the power shaft adjacent to the worm member, means for connecting the clutch gear to the worm member only when the power shaft is rotated in a predetermined direction, gearing for connecting the clutch gear to the feed gear wheels, and means for connecting said tool head to said feed gears.

15. In a planer feed mechanism, the combination with a cross rail having a tool head mounted thereon, and two shafts mounted on the cross rail for respectively effecting movement of the tool head on the cross rail and for effecting vertical movement of the tool on the head with respect to the rail, of power means for rotating said shafts, and means pivotally mounted on the cross rail and located at the front and the rear of the planer for selectively rotating each of said shafts in a forward and in a reverse direction.

16. In a planer feed mechanism, the combination with a cross rail having a tool head mounted thereon, and two shafts mounted on the cross rail for respectively effecting movement of the tool head on the cross rail and for effecting vertical movement of the tool on the head with respect to the rail, of power means for rotating said shafts, and a single lever pivoted to the cross rail and located at the rear of the planer and a single lever also pivoted to the cross rail and located at the front of the planer for selectively controlling the rotation of said shafts from the front and from the rear of the planer.

17. In a planer feed mechanism, the combination with a cross rail having a tool head mounted thereon, two shafts mounted on the cross rail for respectively effecting movement of the tool head on the cross rail and for effecting vertical movement of the tool on the head with respect to the rail, and a shaft mounted on the cross rail for effecting vertical movement of the rail, of power means for rotating said shafts, and means pivotally mounted on the cross rail and located at the front and the rear of the planer for selectively controlling the rotation of said shafts in a forward and in a reverse direction.

18. In a feed mechanism for a planer having side heads, the combination with a cross rail having a tool head mounted thereon, and shafts mounted on said cross rail for effecting movement of the tool head on the rail, for effecting vertical movement of the tool on the head with respect to the rail, for raising and lowering the cross rail, and for controlling the side heads, of power means for rotating said shafts, and means pivotally mounted on the cross rail and located at the front and the rear of the planer for selectively rotating each of said shafts in a forward and in a reverse direction.

19. In a planer feed mechanism, the combination with a cross rail having a tool head mounted thereon, and two shafts mounted on the cross rail for respectively effecting movement of the tool head on the cross rail and for effecting vertical movement of the tool on the head with respect to the rail, of a motor operable in a forward and in a reverse direction, means operated by said motor for rotating the shafts at one speed when the motor is rotated in one direction and for rotating the shafts at a different speed when the motor is rotated in a reverse direction, and means located at the front and the rear of the planer for selectively controlling the rotation of said shafts in a forward and in a reverse direction.

20. In a feed mechanism for a planer having side heads, the combination with a cross rail having a tool head mounted thereon, and shafts mounted on said cross rail for effecting movement of the tool head on the rail, for effecting vertical movement of the tool on the head with respect to the rail, for raising and lowering the cross rail, and for controlling the side heads, of a motor operable in a forward and in a reverse direction, means operated by said motor for rotating the shafts at one speed when the motor is rotated in one direction and for rotating the shafts at a different speed when the motor rotation is reversed, and means located at the front and the rear of the planer for selectively controlling the rotation of said shafts in a forward and in a reverse direction.

21. In a planer feed mechanism, the combination with a cross rail having a tool head mounted thereon, and mechanism mounted on the cross rail for operating said tool head, of a motor operable in a forward and in a reverse direction, means operated by said motor for operating said mechanism at one speed when the motor is rotated in one direction and for operating the mechanism at a different speed when the rotation of the motor is reversed, and means located at the front and the rear of the planer for controlling said mechanism.

22. In a planer feed mechanism, the combination with a cross rail having a tool head mounted thereon, side heads, and mechanism mounted on the cross rail for operating the tool head, for raising and lowering the rail and for operating the side heads, of a motor operable in a forward and in a reverse direction, means operated by said motor for operating said mechanism at one speed when the motor is operated in one direction and for operating the mechanism at a different speed when the motor operation is reversed, and means located at the front and the rear of the planer for controlling said mechanism.

23. In a planer feed mechanism, the combination with a cross rail having a tool head mounted thereon, and power mechanism for feeding said head along the rail, of means operable from the front and the rear of the planer for controlling said mechanism to start and stop the feeding and to vary the feeding movement.

24. In a planer feed mechanism, the combination with a cross rail having a tool head mounted thereon, and power mechanism for feeding the head along the rail and for raising and lowering the rail, of means operable from the front and from the rear of the planer for controlling said power mechanism to start and stop the feeding, to vary the feeding movements and to raise and lower the cross rail.

25. In a planer feed mechanism, the combination with a cross rail having tool heads mounted thereon, and power mechanism for moving the heads along the rail and for raising the tool on the head with respect to the rail, of means operable from the front and from the rear of the planer for controlling said power mechanism selectively to move the heads and tools and to vary such movements.

26. In a planer feed mechanism, the combination with a cross rail having tool heads mounted thereon, and power mechanism for moving the heads along the rail, for raising the tools on the heads with respect to the rail and for raising and lowering the rail, of means operable from the front and from the rear of the planer for controlling said power mechanism selectively to move the heads and the tools, to vary such movements, and to raise and lower the rail.

27. In a planer feed mechanism, the combination with a cross rail having a tool head mounted thereon, a motor mounted on said rail, and a side head mounted adjacent to the rail, of mechanism for effecting feeding movements of the tool head and for effecting feeding movements of the side head, means operable from the front and the rear of the planer for varying the amount of feeding movements effected by the heads, and means for varying the ratio of feeding movement between the heads.

28. In a planer feed mechanism, the combination with a cross rail having a tool head mounted thereon, a motor mounted on said rail, and a side head mounted adjacent to the rail, of mechanism for effecting feeding and traversing movements of the tool head and the side head, means located at the front and the rear of the planer for controlling said mechanism to selectively operate the heads, means located at the front and the rear of the planer for varying the rate of feeding or traversing movements effected by the heads, and means for varying the amount of feeding or traversing movement effected by one head with respect to the other head.

29. In a planer feed mechanism, the combination with a side head, power mechanism for operating said head, and means controlled from the front or from the rear of the planer for controlling said power mechanism to vary the movement of the side head, of auxiliary means associated with the side head for varying the movement thereof independently of the means for controlling the power mechanism.

30. In a planer feed mechanism, the combination with a side head, power mechanism for operating said head, and means controlled from the front or from the rear of the planer for controlling said power mechanism to vary the movement of the side head, of auxiliary means comprising change gears associated with the side head for varying the movement thereof independently of the means for controlling the power mechanism.

31. In a planer feed mechanism, the combination with a side head, power means for effecting feeding movements of the side head, and control means operable from the front and from the rear of the planer for controlling the power mechanism to vary the feeding movements of the head and to start and stop the feeding movements, of means associated with said side head for varying the feeding movements independently of the control means.

32. In a planer feed mechanism, the combination with tool heads, side heads, power mechanism for effecting feeding movements by said heads, and control means operable from the front and from the rear of the planer for controlling said power mechanism to selectively operate the heads and to effect feeding at different rates, of means operable independently of said control means and power mechanism for varying the feeding movement of either side head.

In testimony whereof, I hereto affix my signature.

NICHOLAS MARCALUS.